US005536904A

United States Patent [19]

Kojima et al.

[11] Patent Number: 5,536,904

[45] Date of Patent: Jul. 16, 1996

[54] WATERPROOF CONSTRUCTION OF WIRE

[75] Inventors: Kenji Kojima; Satoshi Amihiro, both of Yokkaichi, Japan

[73] Assignee: Sumitomo Wiring Systems, Ltd., Yokkaichi, Japan

[21] Appl. No.: 231,490

[22] Filed: Apr. 22, 1994

[30] Foreign Application Priority Data

May 24, 1993 [JP] Japan .................................... 5-027086

[51] Int. Cl.$^6$ .................................................... H02G 15/20

[52] U.S. Cl. ........................... 174/23 R; 156/48; 174/20; 174/22 R; 174/72 A; 174/76; 174/84 R

[58] Field of Search ............................... 174/23 R, 22 R, 174/20, 72 A, 71 R, 76, 84 R, 88 R; 156/48

[56] References Cited

U.S. PATENT DOCUMENTS

| | | | |
|---|---|---|---|
| 2,957,038 | 10/1960 | Greenidge et al. | 174/23 R |
| 3,347,974 | 10/1967 | Arendt et al. | 174/23 R |
| 3,427,393 | 2/1969 | Masterson | 174/76 |
| 3,589,121 | 6/1971 | Mulvey | 57/162 |
| 3,900,241 | 8/1975 | Fry | 174/72 A |
| 4,280,062 | 7/1981 | Miller et al. | 307/10 LS |
| 4,461,736 | 7/1984 | Takagi | 174/23 R |
| 4,734,545 | 3/1988 | Susuki et al. | 174/120 SR |
| 4,793,877 | 12/1988 | Mineur | 174/23 R |
| 4,845,309 | 7/1989 | Vincent et al. | 174/23 R |
| 5,151,143 | 9/1992 | Downie | 174/23 R |
| 5,168,124 | 12/1992 | Taches et al. | 174/23 R |
| 5,271,081 | 12/1993 | Chill | 174/23 R |
| 5,281,763 | 1/1994 | Hey et al. | 174/84 R |
| 5,294,755 | 3/1994 | Kawakami et al. | 174/264 |
| 5,306,195 | 4/1994 | Hayashi | 439/587 |

FOREIGN PATENT DOCUMENTS

| | | | |
|---|---|---|---|
| 005015 | 4/1982 | European Pat. Off. . | |
| 2569911 | 3/1986 | France . | |
| 2348337 | 4/1974 | Germany | 174/23 R |
| 3446238 | 6/1986 | Germany | 174/23 R |
| 48-29114 | 9/1973 | Japan | 174/23 R |
| 52-146885 | 6/1977 | Japan . | |
| 53-10879 | 1/1978 | Japan . | |
| 1188286 | 4/1970 | United Kingdom . | |
| 1284740 | 8/1972 | United Kingdom . | |
| 1464325 | 2/1977 | United Kingdom . | |
| 2099639 | 12/1982 | United Kingdom . | |

OTHER PUBLICATIONS

United Kingdom Search Report, J. L. Freeman, Jul. 27, 1994, one page.

*Primary Examiner*—Morris H. Nimmo
*Attorney, Agent, or Firm*—Greenblum & Bernstein

[57] ABSTRACT

A waterproof construction of a wire for a motor vehicle, which wire has one or more strands and an insulating coating surrounding the strands and is connected to a nonwatertight terminal including a terminal fixed directly to a body of the motor vehicle and a terminal mounted on a nonwatertight connector, wherein at a portion of the wire between its location connected to the nonwatertight terminal and a first branch point, the insulating coating is removed from the wire so as to expose the strands and waterproof material is filled among the strands such that an insulating and waterproofing coating member is wound around an outer periphery of the waterproof material.

14 Claims, 4 Drawing Sheets

WATERPROOF CONSTRUCTION OF WIRE

BACKGROUND OF THE INVENTION

The present invention generally relates to a waterproof construction of wires in a wiring harness for a motor vehicle and more particularly, to a construction which is capable of easily waterproofing wires connected to a terminal attached to a location which droplets hit directly or a terminal to be mounted on a nonwatertight connector.

As shown in FIG. 1, water is likely to be directly splashed on a wiring harness W disposed in an engine room of a motor vehicle. Especially, in case a terminal (LA terminal) T connected to a wire of the wiring harness W is directly bolted to a body panel or the like or a terminal is mounted on a nonwatertight connector C, water is apt to penetrate among strands of wires connected to these nonwatertight terminals by capillarity. Water which has penetrated into the wires proceeds to a cabin as shown by the arrows in FIG. 1 and reaches connectors (not shown) provided in the cabin, thereby resulting in corrosion of terminals accommodated in these connectors.

Conventionally, in order to prevent the above mentioned penetration of water through the wires, it has been proposed that waterproofing is performed as shown in FIG. 3 at branch points P-1 and P-2 where branch wires W2 and W3 branch off from a main wire W1 connected to the nonwatertight terminal T as shown in FIG. 2. In this waterproofing, coatings of the main wire W1 and the branch wires W2 and W3 are partially peeled at the branch points P1 and P2. Then, peeled portions of the wires W1 to W3 and portions of the wires W1 to W3, which are disposed upstream and downstream of the peeled portions of the wires W1 to W3, are wrapped in a doubled waterproof film 4 such that the wires W1 to W3 are embedded in sealing compound 5 sticking to an inner surface of the waterproof film 4. Subsequently, another waterproof film 6 is wrapped around the waterproof film 4.

However, in this known waterproofing method, all the branch points should be waterproofed, which is troublesome. Furthermore, since waterproof materials used for this known method, for example, silicone, butyl rubber, etc. are expensive, waterproofing cost rises due also to increase of the number of portions requiring waterproofing. Meanwhile, since the waterproof material is filled only between the wires, it is impossible to prevent water from penetrating among strands of the wires from the terminal T by capillarity. Furthermore, when the above mentioned waterproofing has been performed, the waterproofed portion swells. As a result, such drawbacks are incurred that the waterproofed portion cannot be inserted into a corrugated tube, a clip cannot be attached to the waterproofed portion by circumferentially winding the clip around the waterproofed portion and the waterproofed portion cannot be inserted into the protector.

Alternatively, as shown in FIG. 4, it has been proposed that a waterproof sheet 7 in which sealing compound 5' is applied to a butyl rubber sheet or the like is wrapped around a contact bonding portion between a wire W1 and a terminal T. However, in this known method, the contact bonding portion around which the waterproof sheet 7 is wound swells. Thus, as shown in FIG. 5, when a nut N is screwed onto a bolt B by inserting the bolt B through a bolt hole of the terminal T, it is difficult to obtain sufficient clamp area required for screwing the nut N onto the bolt B.

Furthermore, such a countermeasure as shown in FIG. 6 is known in which the wiring harness W is enclosed by a protector 8 so as to prevent water from being splashed on the wiring harness W in the directions of the arrows. However, when water is splashed on the terminal T even if the wiring harness W is covered by the protector 8, water is sucked up from the terminal T by capillarity as described above and thus, it is impossible to prevent water from penetrating among strands of the wire.

Therefore, as shown in FIG. 7, if a portion 9 for mounting the terminal T thereon is also enclosed by a protector 8' in addition to the protector 8 for the wiring harness W and the terminal T is provided on an inner vertical wall face of the protector 8', it is possible to prevent droplets from being directly splashed on the terminal T. However, in this case, the protector 8' becomes large in size, thereby resulting in rise of waterproofing cost. Furthermore, in view of efficiency for mounting the terminal T on the portion 9, it is preferable that the wire is as long as possible. However, in this case, an excess portion of the wire is produced and thus, the wire hangs downwardly. On the contrary, when the wire is shortened, efficiency for mounting the wire on the portion 9 drops undesirably. Moreover, if the portion 9 is covered by the protector 8', an operator readily fails to mount the terminal T on the portion 9 and the terminal T is likely to be fastened to the portion 9 insufficiently.

In addition, in case a terminal is mounted on a nonwatertight connector, penetration of water into a wire from the nonwatertight connector can be prevented by covering the nonwatertight connector by a rubber boot or simply injecting grease, etc. into a terminal receiving portion of the nonwatertight connector. However, when the nonwatertight connector is covered by the rubber boot, waterproofing cost rises and it becomes difficult to couple the connector and a mating connector with each other. Meanwhile, in the above mentioned another prior art waterproofing method in which grease is injected into the terminal receiving portion of the connector, such a problem arises that due to change of quality of grease with time, grease is washed away from the terminal receiving portion by rainwater or splash from a road surface.

SUMMARY OF THE INVENTION

Accordingly, an essential object of the present invention is to provide, with a view to eliminating the above mentioned inconveniences of conventional waterproof constructions of wires, a waterproof construction of wires in which delivery of water to a branch wire from a main wire connected to a nonwatertight terminal can be prevented.

In order to accomplish this object of the present invention, the present invention provides a waterproof construction of a wire for a motor vehicle, which wire has one or more strands and an insulating coating surrounding the strands and is connected to a nonwatertight terminal including a terminal fixed directly to a body of the motor vehicle and a terminal mounted on a nonwatertight connector, wherein at a portion of the wire between its location connected to the nonwatertight terminal and a first branch point, the insulating coating is removed from the wire so as to expose the strands and waterproof material is filled among the strands and an insulating such that waterproofing coating member is wound around an outer periphery of the waterproof material.

In order to remove the insulating coating from the wire, an arbitrary method in which the strands are exposed over a predetermined axial distance, for example scalping or thrusting may be employed.

Meanwhile, in order to fill the waterproof material among the exposed strands, a method is preferably employed in which rubber material such as liquid silicone and pasty NBR obtained by dissolving NBR in organic solvent, photosetting resin or thermosetting resin is injected over the strands and then, is hardened. Alternatively, solder may also be penetrated among the strands. Furthermore, such a method may also be employed in which surfaces of the strands are fused by thermal adhesion or ultrasonic bonding and the fused portions of the strands are filled into gaps among the strands.

A butyl rubber sheet or the like is preferably employed as an insulating and waterproofing coating member for covering the waterproof material filled into the gaps among the strands.

As described above, in the wire which is connected to the nonwatertight terminal water is likely to hit directly and in which water attached to the terminal penetrates among the strands by capillarity, the coating is removed from the wire at a proper location of the wire between the distal end connected to the nonwatertight terminal and the first branch point so as to expose the strands and the waterproof material is filled into gaps among the strands such that penetration of water based on capillarity is prevented. Therefore, before proceeding to the first branch point, water penetrating into the wire from the nonwatertight terminal is intercepted at the waterproofed portion in which the waterproof material is filled. Since water is prevented from penetrating into the wire before reaching the first branch point, waterproofing is not required to be performed at all the branch points and may be performed at only one location.

Meanwhile, if waterproofing is performed at a position of the wire distant from the distal end connected to the terminal, an electrical contact portion of the terminal can be brought into close contact with the distal end of the wire and thus, a sufficient area of contact between the terminal and the wire can be secured.

Furthermore, the waterproofed portion can be obtained by such simple procedures in which after the waterproof material has been filled among the strands by removing the insulating coating from one wire, the coating material is covered by the insulating and waterproofing member such as a butyl rubber sheet. Therefore, outside diameter of the waterproofed portion can be so set as to be substantially equal to or slightly larger than that of other portions of the wire than the waterproofed portion. Accordingly, not only the waterproofed portion can be inserted through a corrugated tube or a protector but a clamp member can be attached to the waterproofed portion.

BRIEF DESCRIPTION OF THE DRAWINGS

This object and features of the present invention will become apparent from the following description taken in conjunction with the preferred embodiment thereof with reference to the accompanying drawings, in which:

FIGS. 11*a* to 11*e* are schematic views showing one concrete example of the steps of FIGS. 9*a* to 9*e*.

Before the description of the present invention proceeds, it is to be noted that like parts are designated by like reference numerals throughout several views of the accompanying drawings.

DETAILED DESCRIPTION OF THE INVENTION

Figure 1:
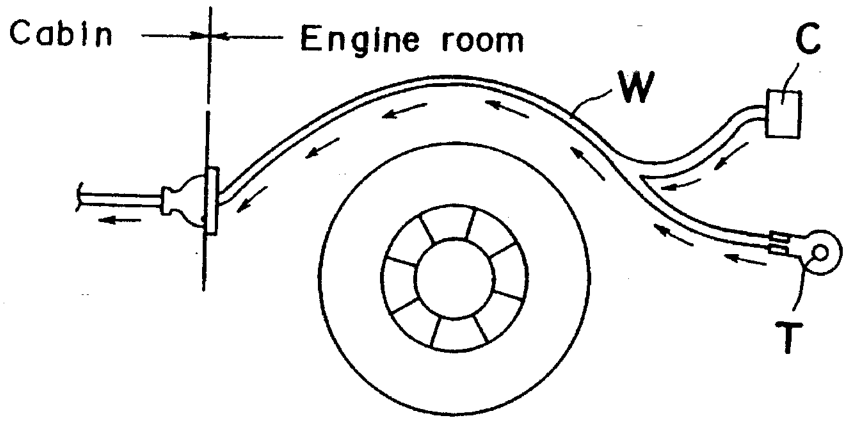
Fig. 1 PRIOR ART
FIG. 1 is a schematic view indicative of a problem in a prior art wiring harness for a motor vehicle (already referred to)
Figure 2:
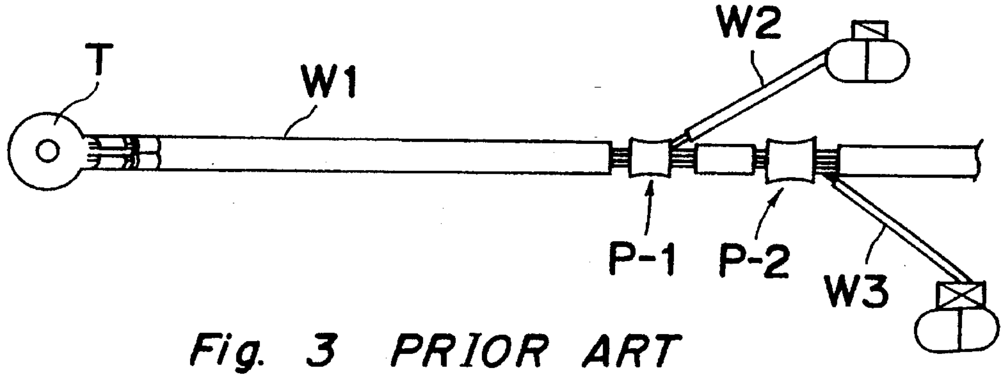
Fig. 2 PRIOR ART
FIG. 2 is a front elevational view showing a prior art waterproofing method (already referred to)
Figure 3:
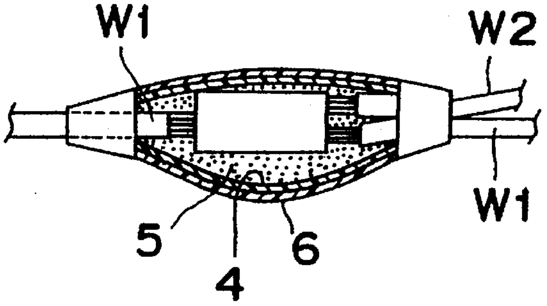
Fig. 3 PRIOR ART
FIG. 3 is a sectional view of a waterproofed portion in the waterproofing method of FIG. 2 (already referred to)
Figure 4:
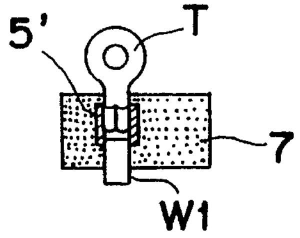
Fig. 4 PRIOR ART
FIG. 4 is a top plan view showing another prior art waterproofing method (already referred to)
Figure 5:
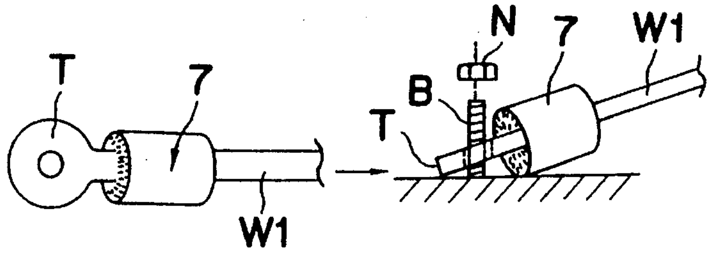
Fig. 5 PRIOR ART
FIG. 5 is a schematic perspective view showing a drawback of the prior art waterproofing method of FIG. 4 (already referred to)
Figure 6:
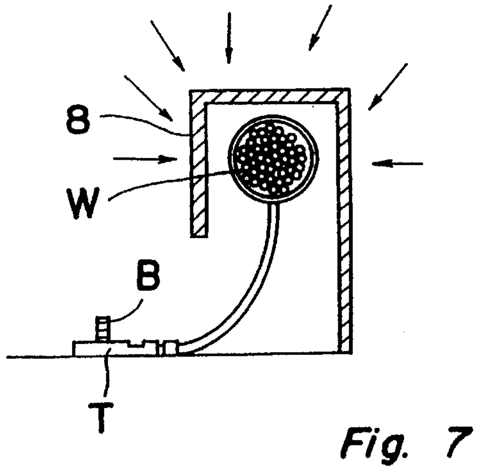
Fig. 6 PRIOR ART
FIG. 6 is a sectional view showing still another prior art waterproofing method (already referred to)
Figure 7:
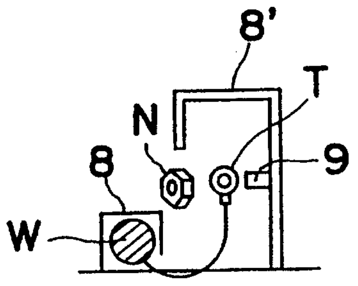
Fig. 7 PRIOR ART
FIG. 7 is a schematic view showing a modification of the prior art waterproofing method of FIG. 6 (already referred to)
Figure 8:
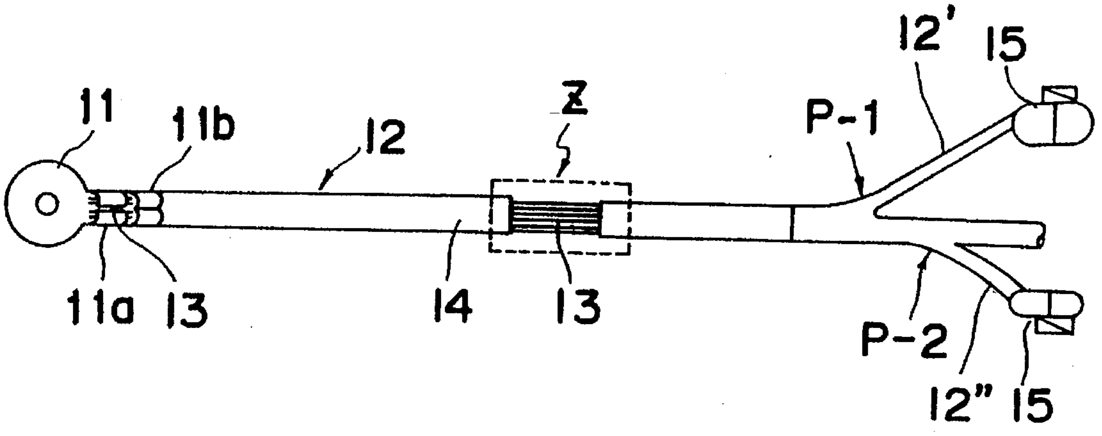
FIG. 8 is a schematic view showing a waterproof construction of wires, according to the present invention.

Referring now to the drawings, there is shown in FIG. 8, a waterproof construction of wires in a wiring harness for a motor vehicle, according to one embodiment of the present invention. In FIG. 8, a terminal 11 including a core barrel 11*a* and an insulating barrel 11*b* is a nonwatertight terminal which is directly secured to a body panel (not shown) by a bolt at a location which water hits directly. Strands 13 exposed at a distal end of a wire 12 are contact bonded to the core barrel 11*a*, while an insulating coating 14 is contact bonded to the insulating barrel 11*b*.

Meanwhile, the wire 12 has a plurality of branch points, for example, branch points P-1 and P-2 in a downstream direction. Branch wires 12' and 12" branch off from the wire 12 at the branch points P-1 and P-2, respectively and a terminal (not shown) contact bonded to a distal end of each of the branch wires 12' and 12" is mounted on a watertight connector 15. Namely, in the motor vehicle, the terminal 11 is disposed in an engine room, while the watertight connector 15 is disposed in a cabin.

Figure 9A:
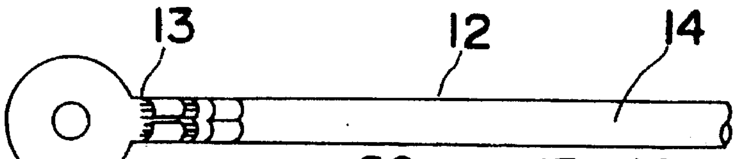
FIGS. 9*a* to 9*e* are schematic views showing steps for obtaining the waterproof construction of FIG. 8.
Figure 9B:
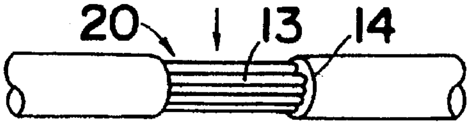
Figure 9C:
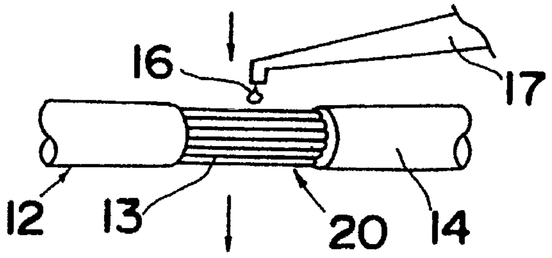
Figure 9D:
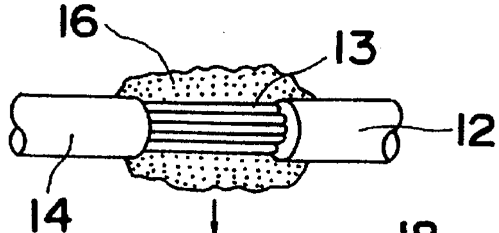

At a proper location Z between a distal end of the wire 12 adjacent to the terminal 11 and the first branch point P-1, the wire 12 is waterproofed as shown in FIGS. 9*a* to 9*e*. Namely, as shown in FIG. 9*a*, strands 13 of the wire 12 are coated by an insulating coating 14. Then, as shown in FIG. 9*b*, the insulating coating 14 is scalped from the wire 12 over a predetermined length at the location Z so as to provide a scalped portion 20 where the strands 13 are exposed. Subsequently, silicone 16 which is liquid rubber acting as waterproof material is supplied to the exposed strands 13 at the location Z from a discharge unit 17 as shown in FIG. 9*c* and is filled in gaps among the strands 13 and around the strands 13 as shown in FIG. 9*d*.

Meanwhile, in this embodiment, "SE9176", which is a brand name of Toray and Dow Corning Silicone Co., Ltd. of Japan and assumes semisolid state in several minutes by water content in air, is employed as the silicone 16. The silicone 16 may also be replaced by pasty acrylonitrile-butadiene rubber (NBR) obtained by dissolving NBR in organic solvent.

Figure 9E:
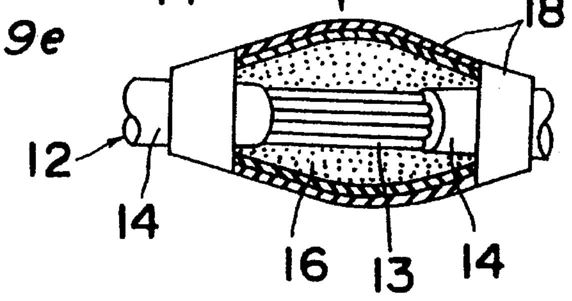

After the silicone 16 has been supplied to the strands 13 as described above, the silicone 16 is covered by a butyl rubber sheet 18 acting as an insulating and waterproof coating member so as to be sealed and opposite end portions of the butyl rubber sheet 18 are bonded to outer peripheries of opposed portions of the insulating coating 14 as shown in FIG. 9*e.*

Figure 10:
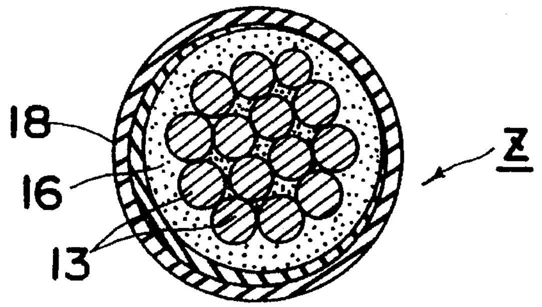
FIG. 10 is a sectional view of the waterproof construction of FIG. 8.
Figure 10:
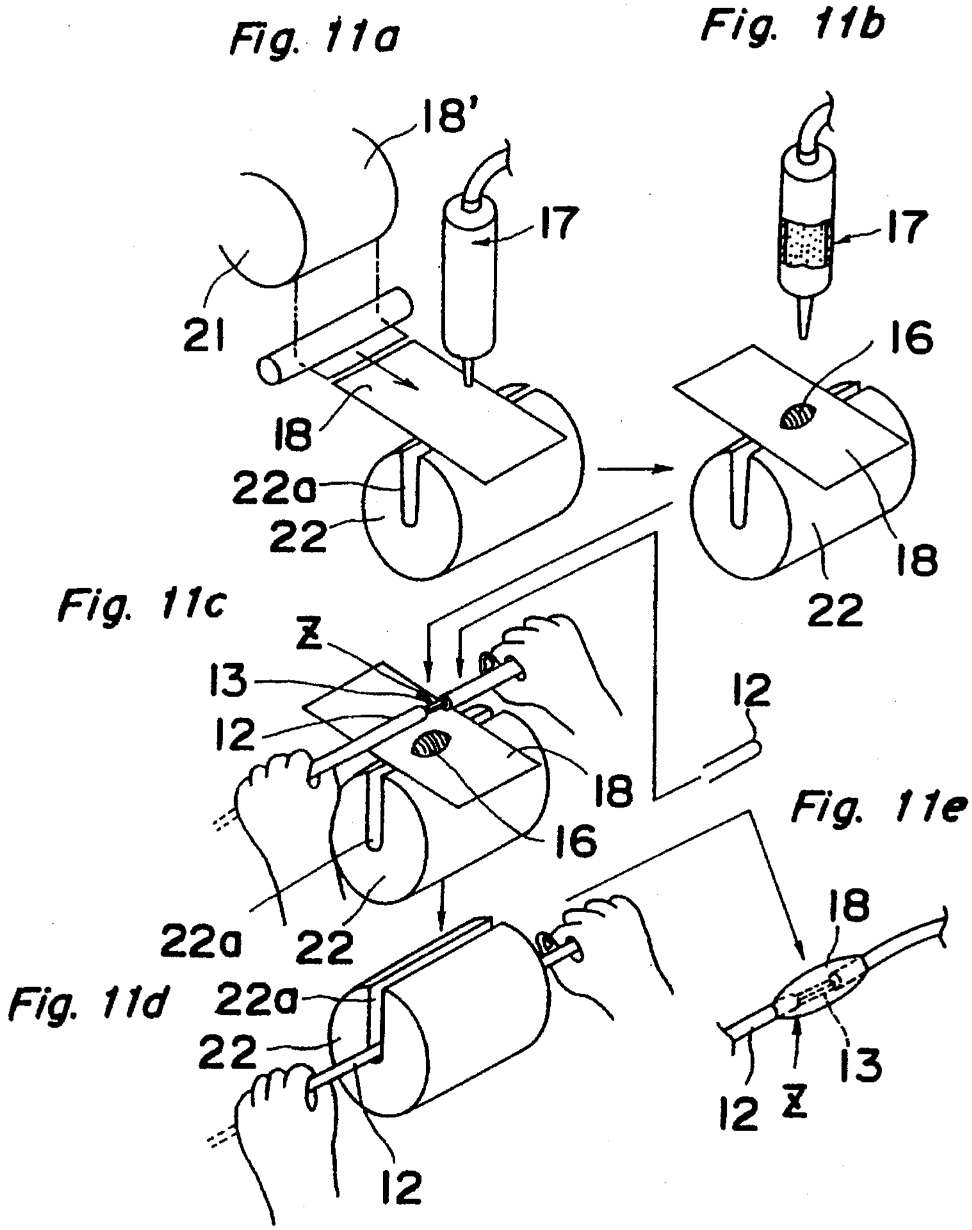

The waterproofed portion Z referred to above has a structure shown in FIG. 10. As shown in FIG. 10, not only all gaps among the strands 13 are filled with the silicone 16 but outer peripheries of the strands 13 are enclosed by the silicone 16. Furthermore, the butyl rubber sheet 18 is brought into close contact with outer periphery of the silicone 16. Accordingly, at this waterproofed portion Z, no gap of even capillarity exists which allows penetration of water thereinto.

Thus, even if water penetrates into gaps among the strands 13 contact bonded to the terminal 11, penetration of water is intercepted at the waterproofed portion Z and thus, penetration of water to the first branch point P-1 is prevented. Therefore, needless to say, even if waterproofing is not performed at the second branch point P-2 and so on, it becomes possible to prevent penetration of water to the branch lines 12" and so on which branch off from the wire 12 at the second branch point P-2 and so on.

FIGS. 11*a* to 11*e* show one concrete example of the waterproofing steps of FIGS. 9*a* to 9*e*. At FIG. 11*a,* a butyl rubber sheet 18' is continuously supplied from a sheet feeder 21 and is cut to a predetermined size so as to obtain the butyl rubber sheet 18 and the cut butyl rubber sheet 18 is supplied to an upper portion of a taping roll 22. An upwardly opening slit 22*a* is formed on the taping roll 22. Then, as shown in FIG. 11*b,* the silicone 16 is discharged from the silicone discharge unit 17 to the butyl rubber sheet 18 disposed on the taping roll 22 at the slit 22*a*. Then, as shown in FIG. 11*c,* the wire 12 in which the insulating coating 14 is preliminarily scalped at the waterproofed portion Z so as to expose the strands 13 is placed on the butyl rubber sheet 18 such that the exposed strands 13 of the waterproofed portion Z are embedded in the silicone 16 discharged onto the butyl rubber sheet 18. Thereafter, as shown in FIG. 11*d,* the wire 12 is fully depressed into the slit 22*a* together with the butyl rubber sheet 18. In this state, the taping roll 22 is rotated such that the butyl rubber sheet 18 is wound around the silicone 16 of the waterproofed portion Z as shown in FIGS. 9*e* and 10. Thus, as shown in FIG. 11*e,* the waterproofed portion Z is completed.

Meanwhile, in FIG. 11*b,* adhesive material is applied to an upper face of the butyl rubber sheet 18. Therefore, upon rotation of the taping roll 22, the butyl rubber sheet 18 is closely bonded to an outer periphery of the semisolid silicone 16 so as to be wound around the silicone 16 twice. In addition, the butyl rubber sheet 18 is closely bonded to outer peripheries of opposed portions of the insulating coating 14 at the waterproofed portion Z.

In this embodiment, silicone is employed as waterproof material but may also be replaced by photosetting resin or thermosetting resin. Furthermore, in place of silicone, solder may also be employed so as to be filled among the exposed strands. Alternatively, the exposed strands themselves may also be subjected to thermal adhesion or ultrasonic bonding such that fused portions of the strands are filled into gaps among the strands.

As is clear from the foregoing description of the present invention, the wire connected to the nonwatertight terminal which water hits directly is waterproofed at a proper location between its distal end connected to the nonwatertight terminal and the first branch point by filling the waterproof material into gaps among the exposed strands. Thus, water which penetrates into the gaps among the strands from the distal end of the wire connected to the terminal can be intercepted before reaching the first branch point. Accordingly, naturally, waterproofing is not required to be performed at each branch point and may be performed at only one location.

Meanwhile, in order to waterproof one wire, such quite simple procedures may be employed in which after waterproof material has been filled into gaps among the exposed strands by scalping the insulating coating from the wire, the waterproof material is covered by the insulating and waterproofing coating member. Therefore, waterproofing can be performed at low cost. Furthermore, since the waterproofed portion of the wire does not swell so large relative to outside diameter of other portions of the wire than the waterproofed portion, the waterproofed portion can be easily inserted through a corrugated tube or a protector and a clip can be attached to the waterproofed portion.

What is claimed is:

1. A waterproof wiring configuration, comprising:

a wire having a plurality of strands;

a first insulating member positioned about first and second portions of said wire, said first and second portions being separated to form an exposed area of said wire;

a waterproofing compound disposed about a portion of said wire and among said strands in said exposed area, said waterproofing compound filling gaps among individual said strands and covering outer peripheries of said strands; and a second insulating and waterproofing member disposed about and contacting said waterproofing compound between said first and second portions.

2. The waterproof wiring configuration of claim 1, wherein said waterproofing compound includes silicon.

3. The waterproof wiring configuration of claim 1, wherein said waterproofing compound includes acrylonitrile-butadiene rubber dissolved in an organic solvent.

4. The waterproof wiring configuration of claim 1, wherein said waterproofing compound includes photosetting resin.

5. The waterproof wiring configuration of claim 1, wherein said waterproofing compound includes thermosetting resin.

6. The waterproof wiring configuration of claim 1, wherein said second insulating and waterproofing member is butyl rubber.

7. The waterproofing wiring configuration according to claim 1, said second insulating and waterproofing member overlapping said first and second portions.

8. A waterproof construction, comprising:

a wire having a plurality of strands, an end of said wire connected to a non-watertight terminal, said wire having a branch point;

a first insulating member disposed about first and second portions of said wire, said first and second portions being separated to form an exposed area of said wire, said exposed area located between said end and said branch point;

a waterproofing compound disposed about said wire and among said strands in said exposed area, said waterproofing compound filling gaps among individual said strands and covering outer peripheries of said strands; and a second insulating and waterproofing member disposed about and contacting said waterproofing compound between said first and second portions.

9. The waterproof wire construction of claim 8, wherein said wire is adapted for attachment in a vehicle, said nonwatertight terminal being secured to a terminal in said vehicle.

10. The waterproof wiring configuration of claim 8, wherein said second insulating and waterproofing member is butyl rubber.

11. The waterproof wiring construction according to claim 8, said second insulating and waterproofing member overlapping said first and second portions.

12. A method for waterproofing a wire, comprising:

providing a wire having a plurality of strands, and being surrounded by a first insulating material;

removing at least a portion of said first insulating material to expose said strands within an exposed area;

applying a first waterproofing material to the exposed strands of said wire and among the exposed strands to cover said plurality of strands in the exposed area, said waterproofing material filling gaps among individual said strands and covering outer peripheries of said strands; and winding a second insulating and waterproofing material around an outer periphery of and in contact with said first waterproofing material and overlapping said first insulating material.

13. The method of waterproofing a wire according to claim 12, wherein said wire has a non-waterproof end connected to a terminal, and a branch point downstream from said non-waterproof end, and wherein said step of removing is performed on a portion of said wire between said non-waterproof end and said first branch point.

14. The method of claim 12, said steps of applying and winding further comprising:

applying said first waterproofing material to said second insulating and waterproofing material;

winding said second insulating and waterproofing material about the exposed area such that said first waterproofing material seals said exposed area.

* * * * *